Oct. 22, 1929.                M. W. CARROLL                1,732,498
                          TRANSMISSION MECHANISM
                            Filed June 14, 1926

Inventor
Monroe W. Carroll
By
Hardway Cather
Attorneys

Patented Oct. 22, 1929

1,732,498

UNITED STATES PATENT OFFICE

MONROE W. CARROLL, OF BEAUMONT, TEXAS

TRANSMISSION MECHANISM

Application filed June 14, 1926. Serial No. 115,741.

This invention relates to new and useful improvements in a transmission mechanism.

One object of the invention is to provide a mechanism of the character described whereby power may be transmitted from a motor and applied to the work and which is readily reversible so that the power may be applied in either direction without reversing the motor.

Another and more specific object of the invention is to provide a mechanism of the character described which has been specially designed for the transmission of power from a motor and applying the same to a conventional rotary drilling machine and whereby the rotary table, of such machine, may be rotated in either direction, as desired, without the necessity of reversing the motor.

With the above and other objects in view this invention has particular relation to certain novel features of construction, operation and arrangement of parts, an example of which is given in this specification and illustrated in the accompanying drawings, wherein:—

Figure 1:
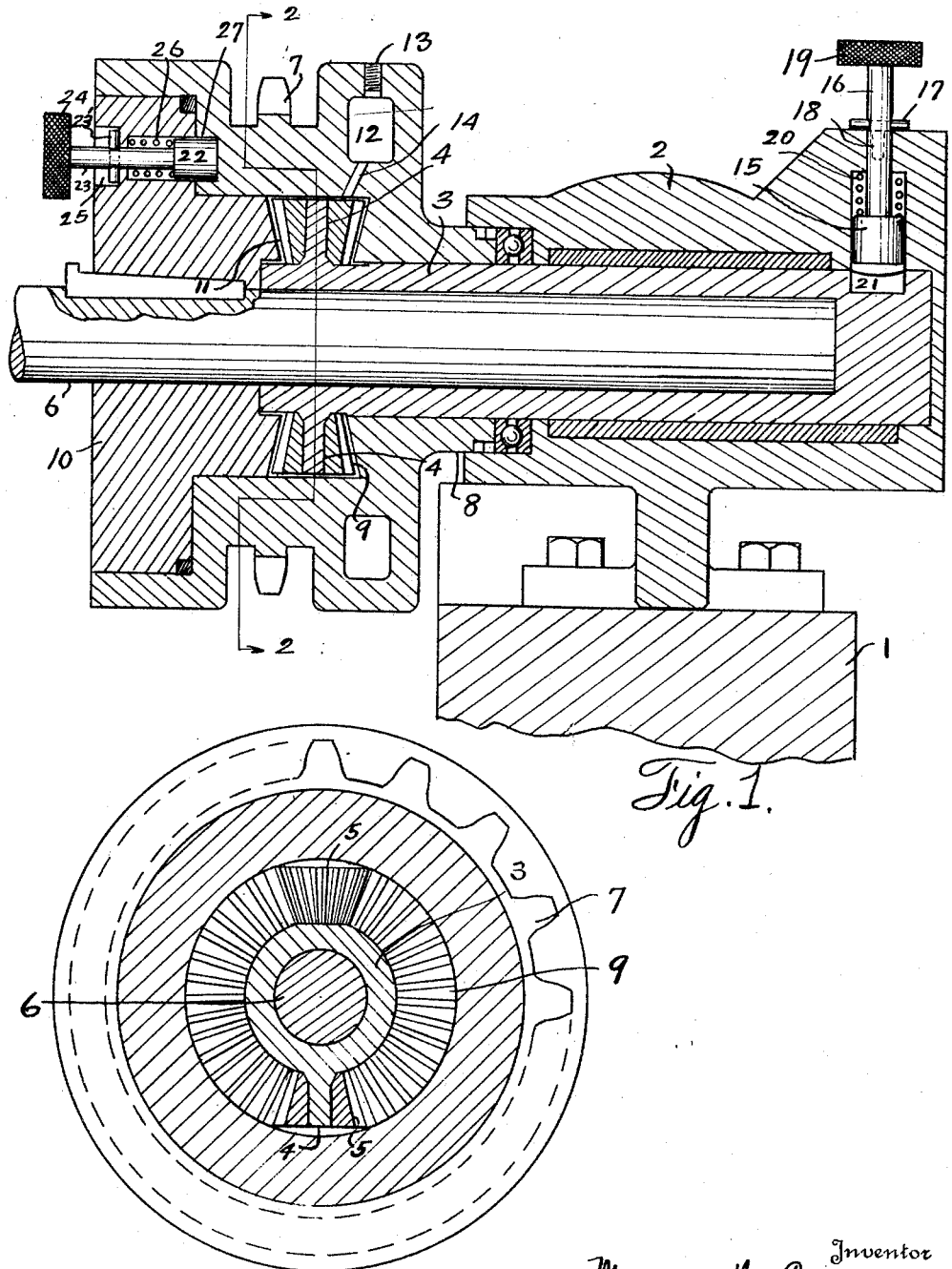
Figure 1 shows a longitudinal sectional view of the device.
Figure 2:
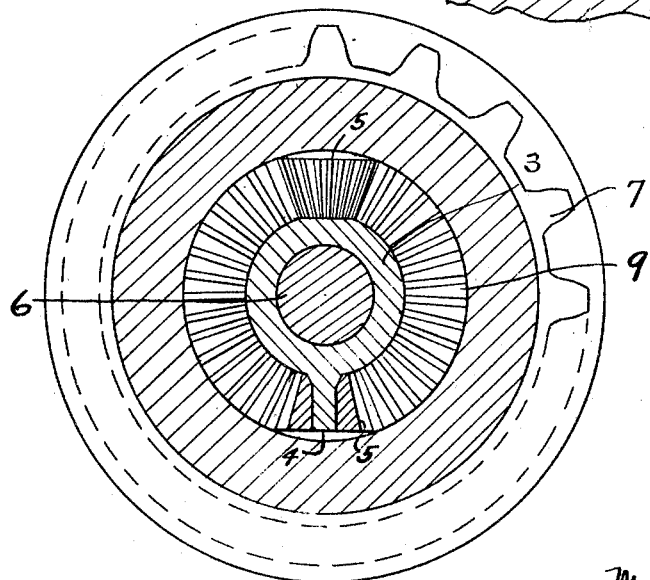
Figure 2 shows a cross sectional view, taken on the line 2—2 of Figure 1.

Referring now more particularly to the drawings, wherein like numerals of reference designate similar parts in each of the figures the numeral 1 designates a support for the sleeve-like bearing 2 which is mounted thereon. Rotatably mounted in this bearing there is a sleeve 3, one end of which is closed and whose other end extends beyond its bearing and has the radiating pintles 4, 4, on which the beveled pinions 5, 5, are mounted to rotate.

One end of the driving shaft 6 is telescoped into and housed by the sleeve 3. There is a sprocket wheel 7, one end of which is reduced forming a hub 8 which runs freely on the sleeve 3 and fits within the adjacent end of the bearing 2. The inner end of this hub has a beveled gear face 9 in mesh with the pinions 5.

Keyed on the shaft 6 and fitted into and housed by the other end of the sprocket wheel 7 there is a gear wheel 10 whose inner end confronts and is spaced from the gear face 9 and is formed with a beveled gear face 11, also in mesh with the pinions 5. The sprocket 7 has an internal annular lubricant chamber 12, having a filling port normally closed by the plug 13 and from this chamber leads a duct 14 through which a lubricant, in the chamber 12, may be fed to the gears 5.

In the bearing 2 there is a spring seated plunger-like key 15, having the outwardly extended stem 16 which carries a transverse lock pin 17, which normally rests on the outer surface of the bearing 2 to hold the key 15 in inactive position. The bearing member 2 is provided with the cross slot 18 and the stem carries a knurled head 19 by means of which the sleeve 16 may be turned to permit the pin 17 to seat in the slot 18 and the key 15 will then be forced, by the spring 20, into the socket 21 of the sleeve 3, when said socket comes into alignment with said key, to lock said sleeve against rotation.

In like manner there is a plunger-like spring seated key 22, in the outer end of the gear 10, and fixed to an outwardly extending stem 23. This stem has the cross pin 24 whose ends normally engages the outer end of the gear 10 to hold the key 22 in withdrawn, or inactive position. The outer end of this stem 23, has an enlarged knurled head 24 by means of which the stem may be turned to align the cross pin 23′ with the cross slot 25, in the outer end of the gear 10, and the spring 26 will then seat the key 22 in the socket 27 in the opposing face of the sprocket 7, when said socket comes into alignment with said key 22 and the gear 10 and sprocket 7 will thereby be locked against relative rotation.

For a direct drive the sprocket 7 and gear 10 are locked together, as described, and the key 15 is locked in said inactive position. As the sprocket 7 is rotated the shaft 6 will rotate, as a unit, therewith. For a reverse drive the sleeve 3 is locked against rotation, as described, and the key 22 is withdrawn to inactive position to permit relative rotation of the sprocket 7 and gear 10 and the direct rotation of the sprocket 7 will now impart rotation to the shaft 6 in a reverse direction, through the pinions 5, and the gear faces 9 and 11 which intermesh with said pinions.

What I claim is:—

1. A transmission mechanism including a rotatable sleeve, a fixed bearing in which said sleeve is mounted, one end of the sleeve extending beyond said bearing, radiating pintles carried by said extended end beveled pinions on said pintles, a driving shaft telescoped into and housed by said sleeve, a sprocket wheel one end of which is reduced, forming a hub which runs on the sleeve, and fits within the adjacent end of said bearing, a beveled gear face on the inside of said sprocket wheel in mesh with said pinions, a gear wheel fixed on said shaft and fitted into and housed by said sprocket wheel the inner end of said gear wheel being formed with a beveled gear face in mesh with said pinions, releasable means adapted to lock said sleeve against rotation and releasable means adapted to interlock said gear wheel with said sprocket.

2. A transmission mechanism including a rotatable sleeve, a fixed bearing in which the sleeve is mounted, one end of the sleeve extending beyond said bearing, beveled pinions mounted to rotate on radiating axis at the extended end of the sleeve, a driving shaft one end of which runs in said sleeve as a bearing, a driven member one end of which is reduced forming a hub which runs on the sleeve and fits within the adjacent end of said bearing, a beveled gear face on the inside of said driven member in mesh with said pinions, a gear wheel fixed on said shaft and fitted into and housed by said driven member the inner end of said gear wheel being formed with a beveled gear face in mesh with said pinions, releasable means adapted to lock said sleeve against rotation and releasable means adapted to interlock said gear wheel and said driven member.

In testimony whereof I have signed my name to this specification.

MONROE W. CARROLL.